Figure 1:
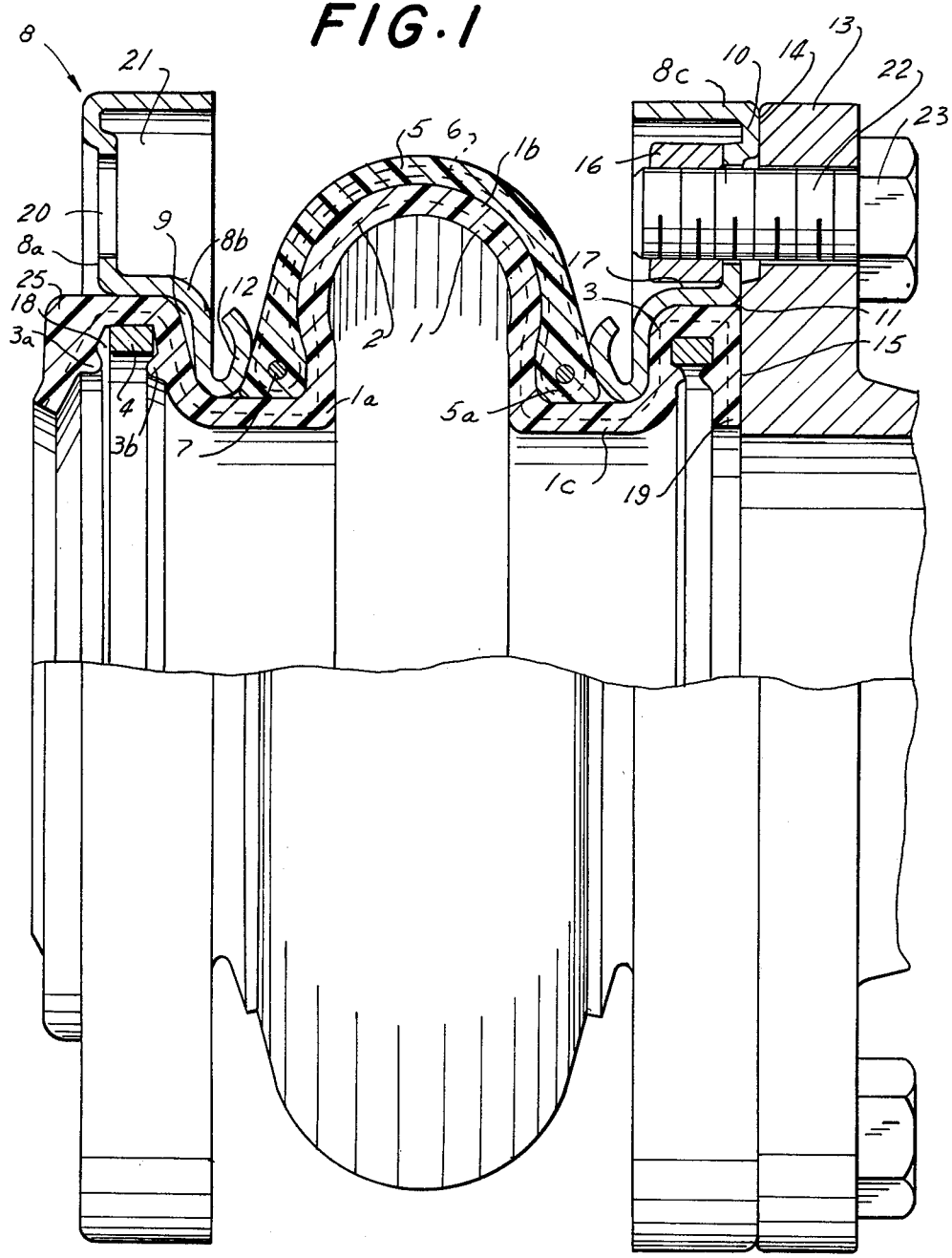

United States Patent [19]

Berghöfer

[11] 4,293,152

[45] Oct. 6, 1981

[54] FLEXIBLE PIPE-CONNECTING FITTING

[76] Inventor: Hans Berghöfer, Alte Landstrasse 274, 2000 Hamburg 65, Fed. Rep. of Germany

[21] Appl. No.: 892,387

[22] Filed: Apr. 3, 1978

[30] Foreign Application Priority Data

Apr. 4, 1977 [DE] Fed. Rep. of Germany ....... 2714963

[51] Int. Cl.³ .............................................. F16L 51/02
[52] U.S. Cl. ...................................... 285/229; 285/412
[58] Field of Search ............... 285/229, 236, 412, 226

[56] References Cited

U.S. PATENT DOCUMENTS

| 1,061,712 | 5/1913 | Whitaker | 285/337 |
| 1,070,667 | 8/1913 | Clark | 285/337 X |
| 3,347,726 | 10/1967 | Wilkinson | 285/229 X |
| 3,359,014 | 12/1967 | Clements | 285/229 X |
| 3,552,776 | 1/1971 | Leymann | 285/229 X |
| 3,666,296 | 5/1972 | Fischetti | 285/229 X |
| 3,912,306 | 10/1975 | McCormick | 285/412 X |
| 4,026,585 | 5/1977 | Berghofer | 285/229 |

FOREIGN PATENT DOCUMENTS 225647  11/1959  Australia ............................ 285/229

Primary Examiner—Thomas F. Callaghan
Attorney, Agent, or Firm—Michael J. Striker

[57] ABSTRACT

A flexible pipe-connecting fitting, particularly for connecting pipe ends located opposite and at an axial distance from one another, includes a tubular connecting member which has a central portion, two transition portions adjoining the central portion, and holding portions each adapted to be installed on a corresponding pipe end. The fitting is further provided with securing elements operative for fixing the holding portions to the corresponding pipe end.

30 Claims, 2 Drawing Figures

FLEXIBLE PIPE-CONNECTING FITTING

The invention relates to a flexible pipe-connecting fitting for connecting pipe ends located opposite and at an axial distance from one another, with a tube-like bellows of rubber or elastomeric synthetic plastic material with an arched dilational wave, transition portions joining the same at both sides and holding portions projecting outwardly relative to the latter, two annular connecting parts respectively engaging behind an associated holding portion of the bellows, each with an annular groove at the side facing away from the dilational wave for receiving the holding portion.

In the pipe-connecting fitting of this type which is known from the German patent DT-PS No. 2,437,240, the bellows has at its end portions a region which conically widens in the axial and outward direction, and a steel cord insert which extends through the entire length of the bellows and which is pre-formed to extend parallel to the outer surface of the bellows in all regions of the bellows. While it is true that these known pipe-connecting fittings have performed to satisfaction in practical applications, the incorporation of a high-strength steel cord insert which extends from one sealing web to the other, which is necessary during the production, causes considerable difficulties. Moreover, under unfavorable circumstances, there can occur a local shearing of the outer rubber or synthetic plastic material layer from the steel cord insert due to the tensile stressing occurring in the end portions of the bellows at a high internal pressure.

It is now an object of the invention to provide an elastic pipe-connecting fitting of the above-mentioned type, which has a high resistance to pressure in the region of the dilation wave, which can be simply and economically manufactured, and which renders an especially reliable pressure-resistant sealing at the connecting locations possible.

The pipe-connecting fitting of the initially mentioned type in accordance with the invention includes a reinforcing bellows of rubber or elastomeric synthetic plastic material surrounding the dilational wave in outward contact therewith, the end portions of which surround the transition portions of the bellows, support rings respectively embedded in the end portions of the reinforcing bellows, and at least one steel cord insert respectively conducted about both support rings and, respectively on the connecting parts, a support collar abutting the end portion of the reinforcing bellows.

Inasmuch as the steel cord insert is arranged in the reinforcing bellows and is respectively conducted about the support rings embedded in these end portions, there is obtained an especially high pressure resistance in the region of the dilational wave which is subjected to the highest stresses. Should the bellows proper on its part also contain a reinforcing insert of steel cord, this need not extend all the way into the sealing webs. However, in view of the reinforcing bellows, it is sufficient in most instances to incorporate only one or more reinforcing inserts of woven or knitted textile materials in the bellows proper. Inasmuch as the reinforcing bellows can be selectively rigidly connected with the bellows proper or manufactured separately from the same and is subsequently pulled over the dilational wave of the bellows, there are additionally obtained considerable advantages for the series production and the stock keeping in that highly stressed pipe-connecting fittings can be used with the reinforcing bellows, and less stressed pipe-connecting fittings can be used without the reinforcing bellows but with metallic rings respectively interposed between the dilational wave and the support surfaces of the connecting parts.

Advantageous further features of the pipe-connecting fitting are described in the dependent claims.

Inasmuch as the connecting parts which engage behind the holding portions of the bellows are intended to abut, on the one hand, the end portions of the reinforcing bellows and, on the other hand, for pressure-resistant outward support of the holding portions, directly the end face of the pipe end, it is especially advantageous to so configurate the connecting parts of steel sheet material that they have an abutment web cooperating with an annular flange of the pipe end, a holding web adjoining the same and constituting the wall of the annular groove, and an outwardly oriented support collar, while simultaneously a recess is formed at the outer side of the holding web between the same and an axial outward web, for sunk accommodation of nuts or bolt heads, so that the reinforcing bellows does not contact the same even at a high internal pressure.

Figure 2:
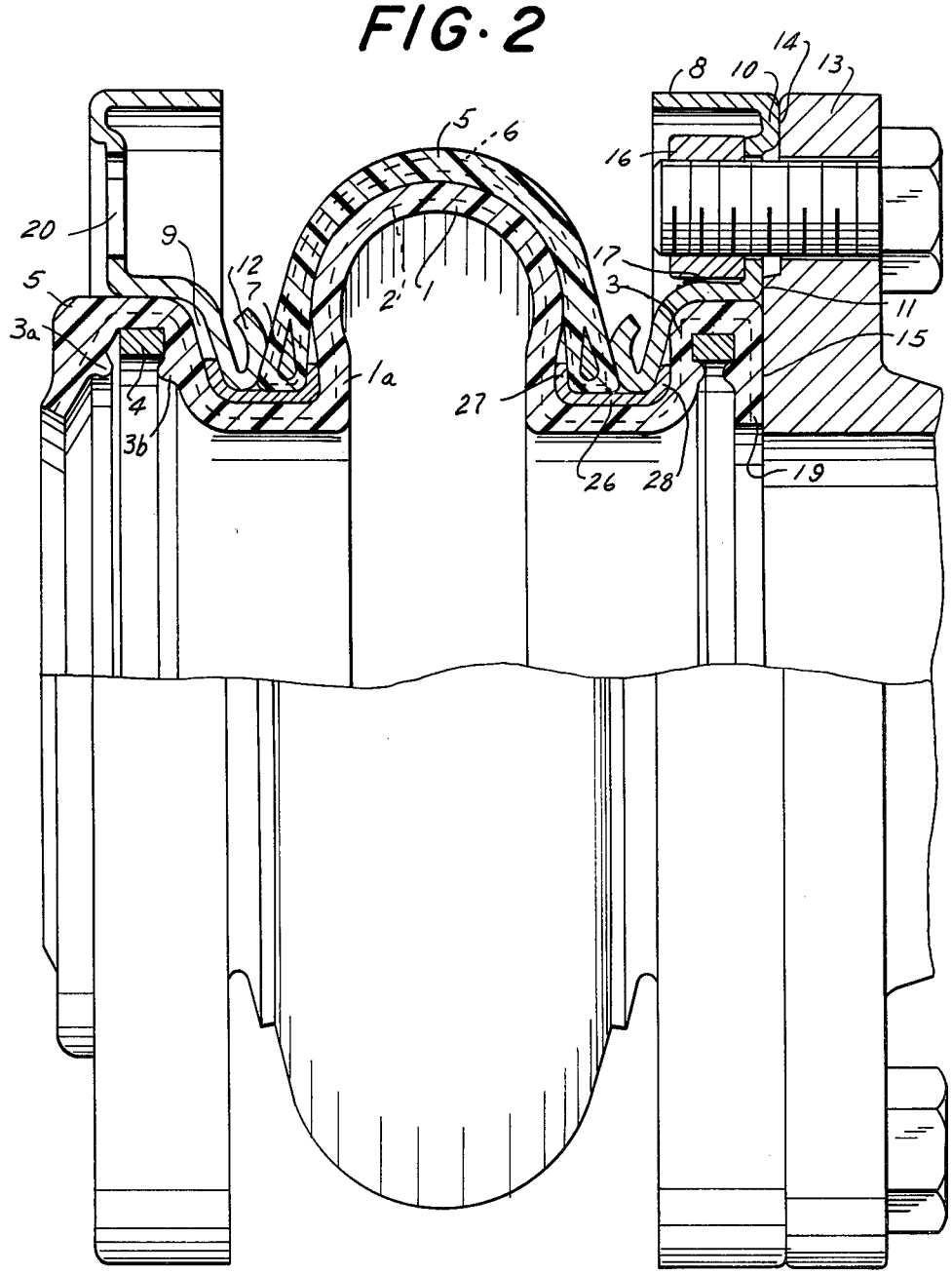

In the following, a preferred embodiment of the pipe-connecting fitting will be further explained with reference to the accompanying drawings. It shows:

FIG. 1 a partially sectioned side elevational view of a pipe-connecting fitting and FIG. 2 a partially sectioned side elevational view of a modified pipe-connecting fitting.

The illustrated pipe-connecting fitting contains a bellows 1 of rubber and/or elastomeric synthetic plastic material with a dilational wave 1b, transition portions 1c which adjoin the same at both sides and which are substantially cylindrical in the illustrated embodiment, as well as holding portions 3 which project outwardly relative to the latter, and sealing webs 19 which are arranged at the outer margins of the latter, forming an inner annular groove 18, and which project inclinedly inwardly in the non-assembled condition. A reinforcing insert 2 of high-strength cord web having weave threads running at an angle of approximately 52° with respect to one another is embedded in the bellows 1 and extends over its entire length. A cross-sectionally substantially triangular nose bulge 25 is formed at the outer side of the sealing web 19. Support bulges 3a and 3b are provided at the inner side of the holding portions 3 and the sealing webs 19, serving for support of a core ring 4 which is inserted into the annular groove 18 and which is outwardly surrounded by the holding portion 3 or the sealing web 19.

A reinforcing bellows 5 is arranged at the outer side of the bellows 1, surrounding the dilational wave 1b in contact therewith, a support ring 7 of steel wire being embedded in each of its end portions 5a. The end portions 5a of the reinforcing bellows 5 respectively abut at their inner surface the cylindrical outer surface of the transition portions 1c. A steel cord insert 6 of a steel cord web which is respectively alternatingly conducted about the two support rings 7 and has a continuous belt configuration, is embedded in the reinforcing bellows 5.

The annular connecting parts 8 which engage behind the holding portions 3 are made, in the illustrated exemplary embodiment, of steel sheet material and respectively include an abutment web 8a provided with bolt openings 20, a holding web 8b which adjoins the same inwardly and forms an annular recess 9 for accommodation of the holding part 3, and a support collar 12 projecting outwardly from its inner margin which abuts the transition portion 1c of the bellows 1, which resiliently abuts the conical outer surface of the end portion 5a of the reinforcing bellows 5 and keeps the same permanently pressed against the outer surface 1a of the dilational wave 1b of the bellows 1. The outer margin of the support collar 12 is bent toward the holding web 8b in order to avoid a pressing, caused by the internal pressure, of the reinforcing bellows against an edge.

Upon assembly, the abutment web 8a directly abuts, with its abutment surface 11 situated inwardly of the bolt opening, an end face 15 of the pipe end which also serves as an abutment for the sealing web 19, so that the holding portion 3 and the sealing web 19 of the bellows 1 lie in an enclosed annular chamber and are the more pressed by the internal pressure acting in the annular groove 18 against the end face 15 or the inner surface of the holding web 8b, the higher is the internal pressure. For further support of the abutment part 8, the abutment web 8a has an annular bulge 10 in its marginal region lying outwardly of the bolt openings 20, which abuts, upon assembly, directly against the end face 14 of an annular flange 13 of the pipe end which is provided with corresponding bolt openings. As a result of this, there is simultaneously avoided a deformation of the abutment part 8 during the tightening of the threaded bolts 22 which pass through the bolt openings 20 and engage threaded nuts 16, to the utmost extent.

An axially angled outer web 8c is arranged at the outer margin of the annular bulge 10, so that a recess 21 is formed between the same and the outer side of the holding web 8b, for sunk accommodation of the threaded nuts 16 which are threadedly connected with the threaded bolts 21 and simultaneously acts as a rotation-preventing abutment surface 17 for the threaded nut 16 so that the same cannot joint in the rotation, caused by means of a fixed spanner, of the head 23 of the threaded bolt 22. As a result of the sunk arrangement of the threaded nuts 16, it is simultaneously achieved that the outer surface of the reinforcing bellows 5 cannot be pressed against the edges of the threaded nuts 16 or the threaded bolts 22 even at high internal pressure.

For lower pressures, the illustrated pipe-connecting fitting can be used even without the reinforcing bellows 5, and then merely a suitable distancing ring need be interposed between the outer surface 1a of the dilational wave and the support collar 12. This renders it possible to utilize the same pipe-connecting fitting with or without reinforcing bellows for the various pressure requirements and also, if need be, to utilize a plurality of mutually interchangeable reinforcing bellows with differently strong dimensioning of the steel cord insert. As a result of this, there is obtained a building-block-type accommodation to the operating requirements and a considerable reduction in manufacturing and storage expenses. Inasmuch as the holding portions 3 of the bellows 1 can be passed without difficulty, after the removal of the inserted core rings 4, through the openings of the connecting parts 8 and the inner margins of the end portions of the reinforcing bellows 5, the assembly and disassembly of the individual parts is simple.

Depending on the requirements, the reinforcing bellows 5 can also be so connected with the bellows 1 as to form one piece therewith. This can be achieved, for example, by glueing the inner surface of the reinforcing bellows 5 to the outer surface of the bellows 1, or by positioning the yet not vulcanized reinforcing bellows 5 on the yet non-vulcanized bellows 1 and by common vulcanization of the same.

The pipe-connecting fitting which has been explained above based on a preferred embodiment, can be modified by a person skilled in the art in accordance with the requirements, in various ways and in correspondence with various purposes; herein, especially the type of the connecting arrangements with the pipe ends provided on the connecting parts, as well as the cross-sectional shape of the annular groove 9, the core ring 4 and the sealing web 19, can be accommodated to the respective conditions. However, it is always important herein that a reinforcing bellows 5, which surrounds only the dilational wave 1b and is provided with embedded steel cord inserts 6, cooperates with the connecting parts 8 only at their side which faces away from the annular groove 9, for continuous support of the bellows 1.

The embodiment illustrated in FIG. 2 corresponds, to a large extent, to the description which is given above with reference to FIG. 1; however, now an intermediate ring 26 which is provided at both ends with radially outwardly projecting annular webs 27 and 28 is arranged between the outer side of the cylindrical transition portions 1c of the bellows 1 and the inner margins of the reinforcing bellows 5 or the support collar 12, being split at least at one location of its circumference; and the support rings which are embedded in the end portions 5a of the reinforcing bellows 5 have a droplet-like cross-section which is elongated in the radial direction. The intermediate ring 26 holds the support collar 12 and the associated end portion 5c of the reinforcing bellows 5 securely together even at an increase of the axial distance between the pipe ends 13 and, furthermore, avoids a penetration, due to the internal subatmospheric pressure, of the transition portion 1c in the abutment gap between the support collar 12 and the reinforcing bellows 5.

I claim:

1. A flexible pipe-connecting fitting for connecting two pipe ends located opposite to and at an axial distance from each other, comprising an elastically deformable tubular hose member having a radially outwardly bulging central portion, two substantially cylindrical transition portions adjoining said central portion at the opposite axial ends thereof, and two holding portions each adjoining a corresponding transition portion at the axially outer end thereof and projecting radially outwardly beyond its corresponding transition portion, each of said holding portions having at its radially outer end a radially inwardly projecting sealing web which sealingly abuts upon assembly an annular end face of the respective pipe end and together with the respective holding portion forms an inner annular groove; a separate reinforcing bellows of elastomeric material surrounding said bulging central portion of said hose member in surface contact therewith and having two end portions each abutting the respective transition portion of said hose member and having a conical outer surface; and two annular connecting members each engaging behind the respective holding portion of said hose member and arranged to be secured to a corresponding pipe end, each of said connecting members having an abutment web for abutting upon assembly directly against an end face of the respective pipe end, an inner annular groove provided at its side remote from said central portion of said hose member and accommodating the respective holding portion of the latter, an inner margin abutting the respective transition portion of said hose member, and a support collar having an outwardly projecting resiliently deflectable lip resiliently abutting said conical outer surface of the respective end portion of said reinforcing bellows in an axial direction thereof.

2. A fitting as defined in claim 1 wherein said hose member is made of rubber.

3. A fitting as defined in claim 1, wherein said hose member is made of elastomeric synthetic plastic material.

4. A fitting as defined in claim 1, wherein said reinforcing bellows has a wall thickness which gradually increases toward its ends.

5. A fitting as defined in claim 1, wherein said connecting members are provided with bolt openings at their outer region with recesses arranged at their sides directed toward said central portion of said member, said recesses being operative for receiving therein corresponding bolt elements.

6. A fitting as defined in claim 1, wherein said connecting members are of steel sheet material.

7. A fitting as defined in claim 5, wherein each of said connecting members has a holding web adjoining said abutment web and constituting the wall of the annular groove.

8. A fitting as defined in claim 7, wherein said abutment web includes an annular bulge situated outwardly of the bolt opening and operative for cooperating with the end face of an annular flange of the pipe end upon assembly.

9. A fitting as defined in claim 8, wherein each of said connecting members further has an external web extending in the axial direction at an outer margin of the abutment web.

10. A fitting as defined in claim 9, wherein the inner surface of the abutment web which is directed towards the reinforcing element is shaped to form an abutment for corresponding bolt elements.

11. A fitting as defined in claim 10, wherein the outer surface of the holding web forming the annular groove is shaped to form a rotation-preventing abutment for threaded nuts and polygonal bolt heads.

12. A fitting as defined in claim 11, wherein said deflectable lip has an outer margin bent towards the holding web.

13. A fitting as defined in claim 1, wherein said inner annular groove of the hose member is operative for receiving a core ring thereon.

14. A fitting as defined in claim 13, wherein said core ring is supported by a projecting bulge at the inner side of each of the holding portion and the sealing web.

15. A coupling as defined in claim 1, wherein said bellows includes at least one embedded reinforcing insert.

16. A coupling as defined in claim 15, wherein at least one of said inserts is of steel cord.

17. A coupling as defined in claim 68, wherein said reinforcing bellows includes support rings embedded in its end portions.

18. A coupling as defined in claim 17, wherein at least one of said inserts is conducted about both of said support rings.

19. A fitting as defined in claim 1, further including means for avoiding penetration of said transition portion between the end portion of said reinforcing bellows and the outer surface of said support collar, which penetration may result from internal forces applied to said transition portion from the interior of said hose member.

20. A fitting as defined in claim 18, wherein said insert is a continuous steel cord belt.

21. A fitting as defined in claim 17, wherein each of said support rings has a cross section elongated substantially in the radial direction of the pipe ends to be connected.

22. A fitting as defined in claim 21, wherein said support rings each have an L-shaped cross-section.

23. A fitting as defined in claim 21, wherein said support rings each have a U-shaped cross-section.

24. A fitting as defined in claim 1, wherein said reinforcing bellows is rigidly connected to said outer surface of said hose member.

25. A fitting as defined in claim 24, wherein said reinforcing bellows is glued to said outer surface of said hose member.

26. A fitting as defined in claim 25, wherein said reinforcing bellows is rigidly connected to said end member due to joint vulcanization thereof.

27. A fitting as defined in claim 19, wherein said avoiding means include an intermediate ring arranged between the outer surface of said transition portion of said hose member and the inner surfaces of said support collar and said reinforcing bellows.

28. A fitting as defined in claim 27, wherein said intermediate ring has a first end portion bent outwardly between said outer surface of the central portion and said inner surface of said reinforcing bellows and a second end portion.

29. A fitting as defined in claim 28, wherein said second end portion is bent outwardly between said outer surface of said holding portion and the inner surface of said support collar.

30. A fitting as defined in claim 28, wherein said intermediate ring is configured with a separation in the circumferential direction.

* * * * *